Figure 1:
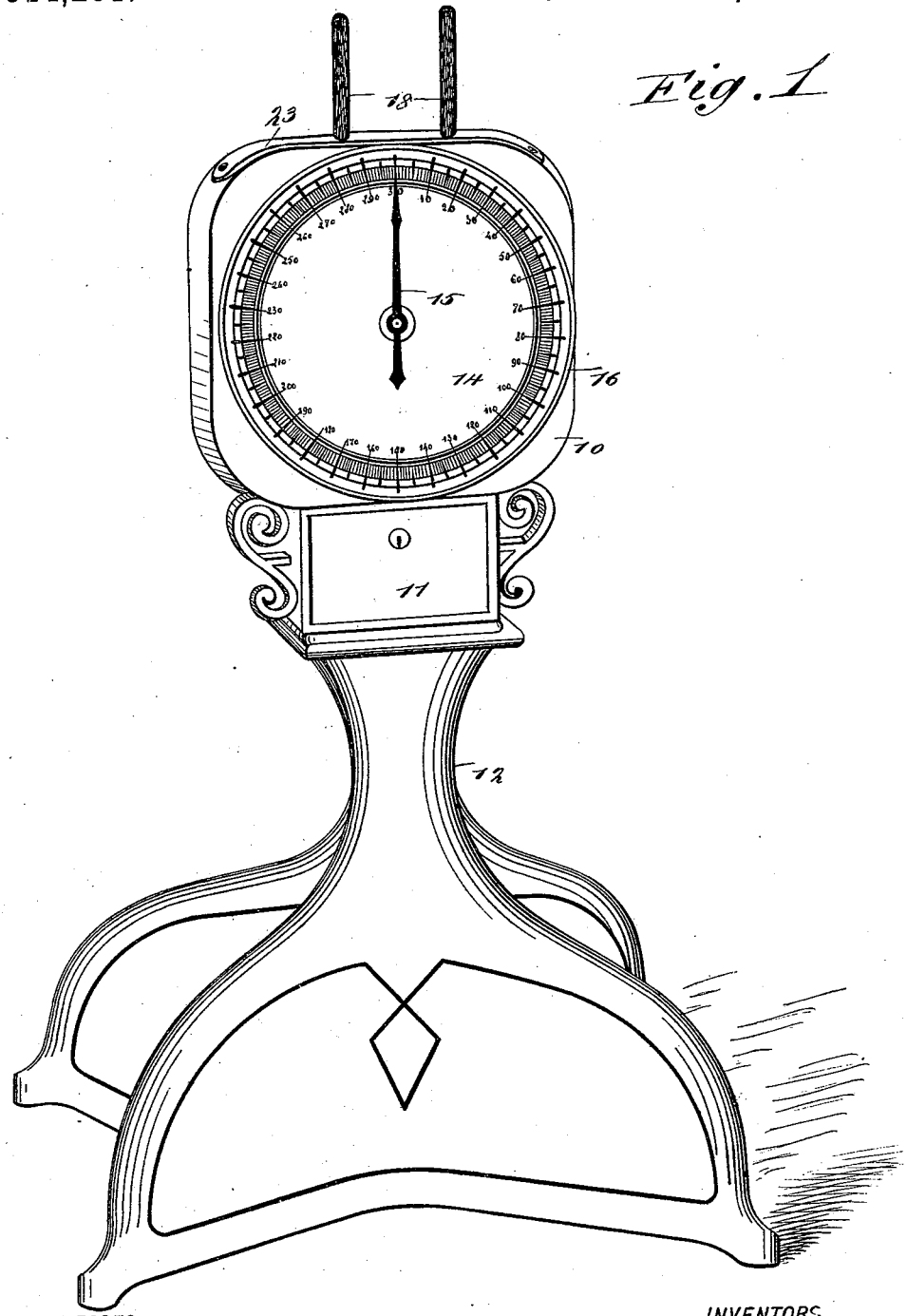

(No Model.) 5 Sheets—Sheet 3.

T. E. J. & W. SCHAIBLY.
GRIP TESTING MACHINE.

No. 514,281. Patented Feb. 6, 1894.

WITNESSES:
C. Neveux
C. Sedgwick

INVENTORS
T. E. J. Schaibly
W. Schaibly
BY Munn & Co
ATTORNEYS.

(No Model.)  T. E. J. & W. SCHAIBLY.  5 Sheets—Sheet 4.
GRIP TESTING MACHINE.

No. 514,281.  Patented Feb. 6, 1894.

WITNESSES:
C. Neveux
L. Sedgwick

INVENTORS
T. E. J. Schaibly
W. Schaibly
BY Munn & Co.
ATTORNEYS.

(No Model.) 5 Sheets—Sheet 5.

T. E. J. & W. SCHAIBLY.
GRIP TESTING MACHINE.

No. 514,281. Patented Feb. 6, 1894.

WITNESSES:
C. Neveux
C. Sedgwick

INVENTORS
T. E. J. Schaibly
W. Schaibly
BY Munn & Co.
ATTORNEYS.

UNITED STATES PATENT OFFICE.

THEOBALD E. J. SCHAIBLY AND WALTER SCHAIBLY, OF PHILADELPHIA, PENNSYLVANIA.

GRIP-TESTING MACHINE.

SPECIFICATION forming part of Letters Patent No. 514,281, dated February 6, 1894.

Application filed July 1, 1893. Serial No. 479,391. (No model.)

*To all whom it may concern:*

Be it known that we, THEOBALD E. J. SCHAIBLY and WALTER SCHAIBLY, of Philadelphia, in the county of Philadelphia and State of Pennsylvania, have invented a new and Improved Grip-Testing Machine, of which the following is a full, clear, and exact description.

Our invention relates to improvements in that class of machines which are used for testing one's grip and particularly to the kind of machine illustrated in Letters Patent of the United States No. 459,022, granted to T. E. J. Schaibly, and dated September 8, 1891.

The object of our invention is to simplify and improve the construction of the machine shown in the patent referred to, to provide means for connecting the tension springs directly to the handle levers and the sides of the containing case, to arrange the levers so that they are not locked, thus lessening the strain on the machine, as where they are locked and people attempt to use them the machine is necessarily strained; to provide a connection between the levers and the registering mechanism of the machine which is thrown into gear by the dropping of a coin into the coin chute of the machine, to arrange the coin chute and the gear controlling levers so that the levers are thrown out of gear as soon as they are started; that is, the levers are released so that they cannot again operate the registering mechanism until another coin is dropped; to provide a brake mechanism which holds the indicating hand at the point to which it is pressed, which mechanism may be released by pressing a button, also to provide means whereby the pressing of the said button will return the hand to its normal position and will also return the gear mechanism on the handles to its normal position, and in general to arrange the mechanism of the machine so that it will operate very smoothly and evenly and will not easily get out of repair.

A further object of our invention is to improve the means of closing the slot in the top of the machine, in such a way that the slot will be kept closed while the handles and levers move through it, and also to provide, in connection with one of the sliding closure plates, a knife, which shall move over the top of the coin chute so that in case a person has lowered a coin by a string into the machine, the string will be severed and his coin lost.

To these ends our invention consists of certain features of construction and combinations of parts, as will be hereinafter described and claimed.

Reference is to be had to the accompanying drawings forming a part of this specification, in which similar figures of reference indicate corresponding parts in all the views.

Figure 2:
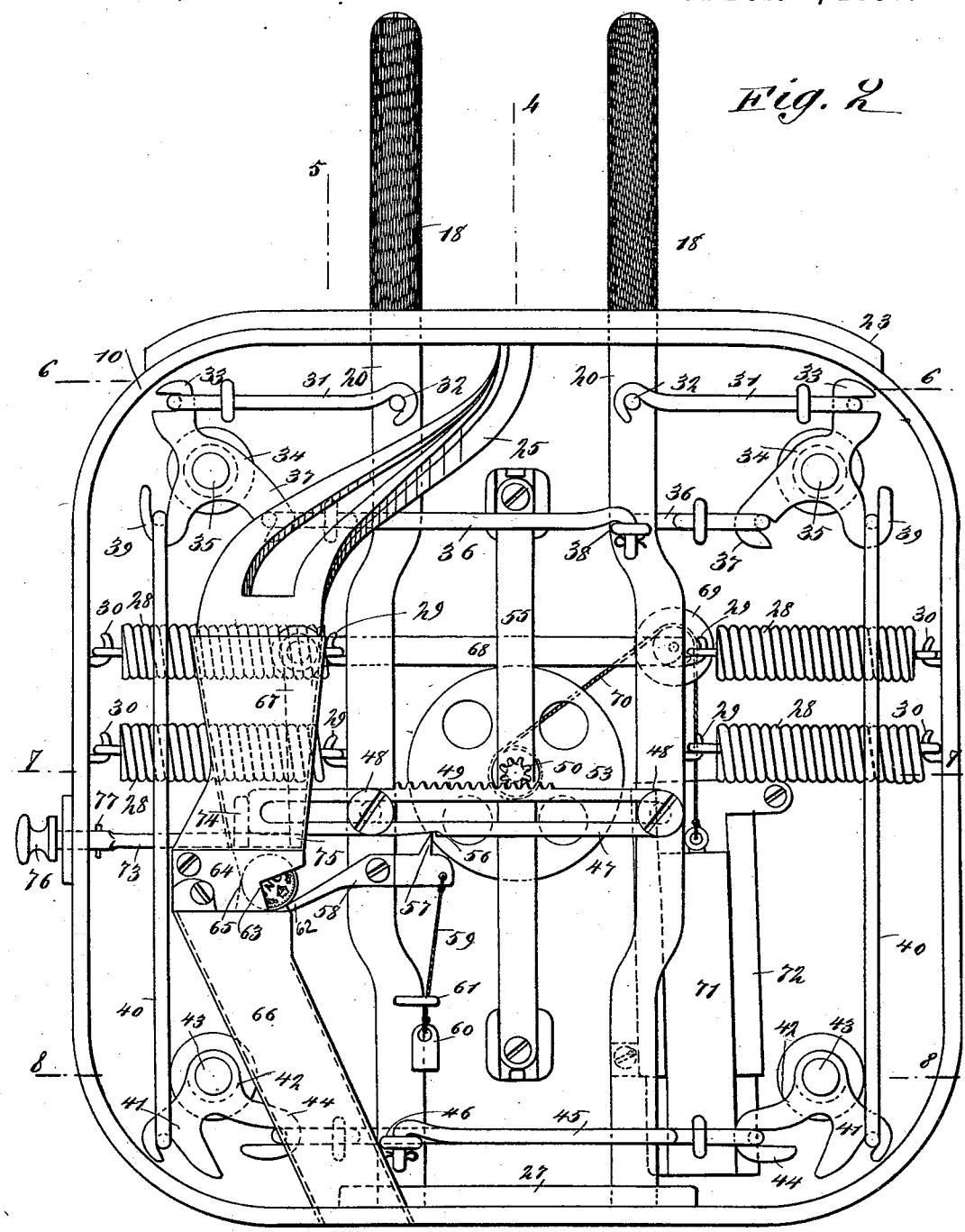
Figure 3:
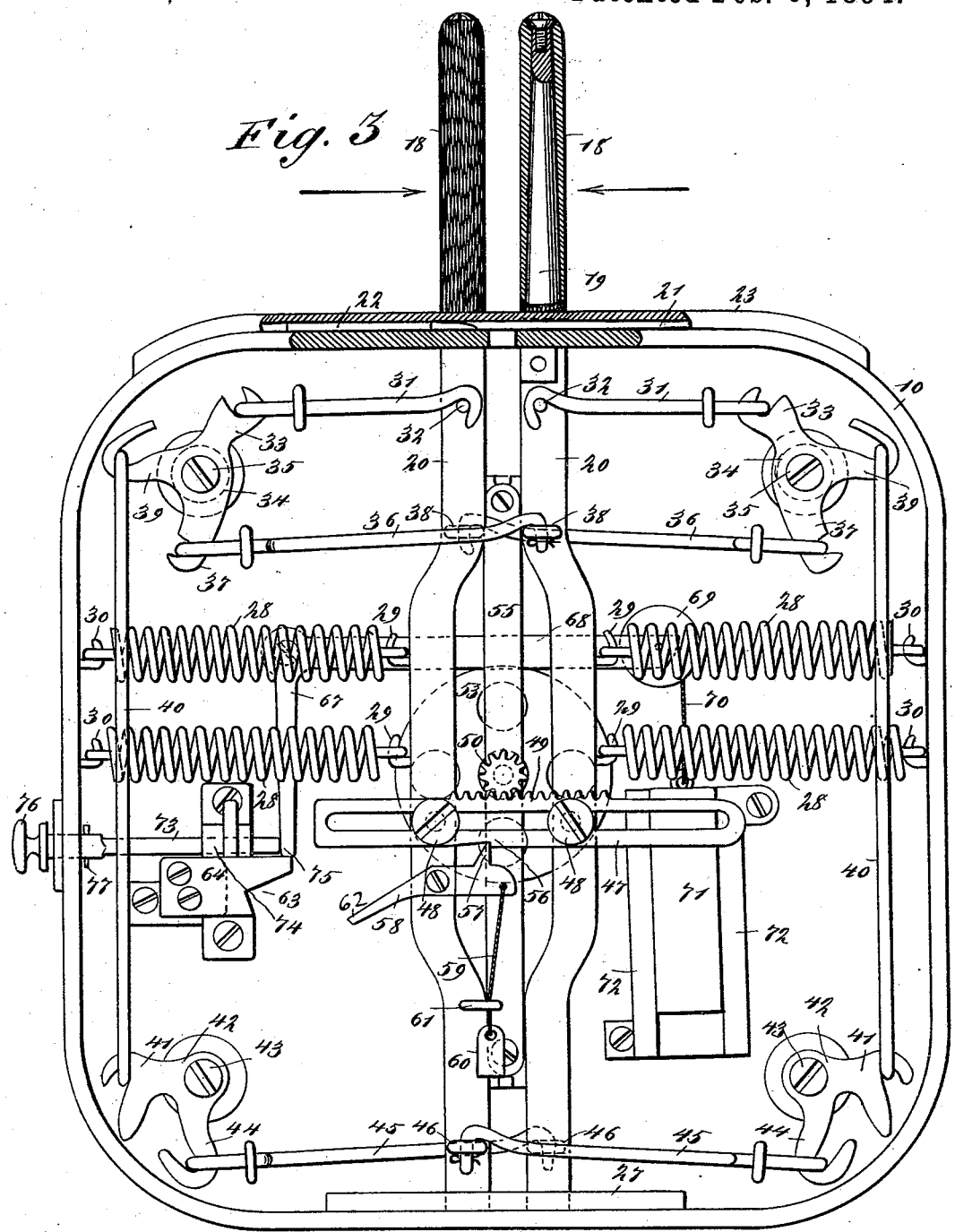
Figure 5:
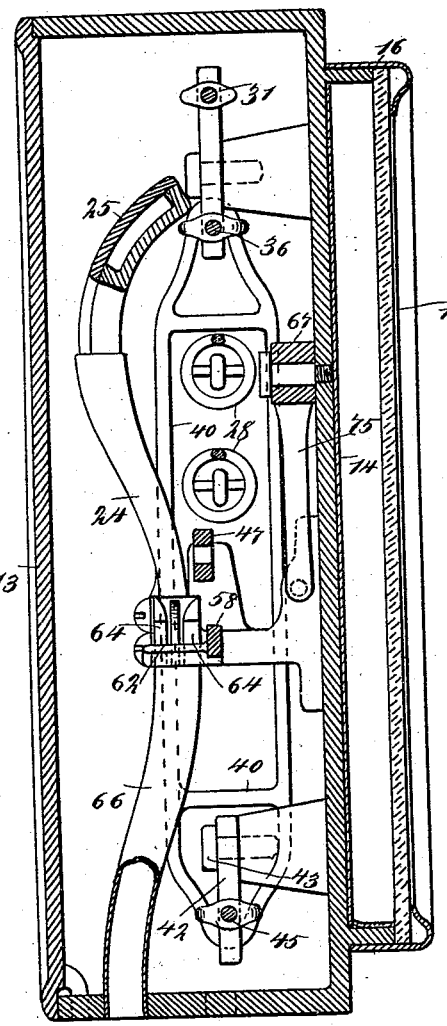
Figure 4:
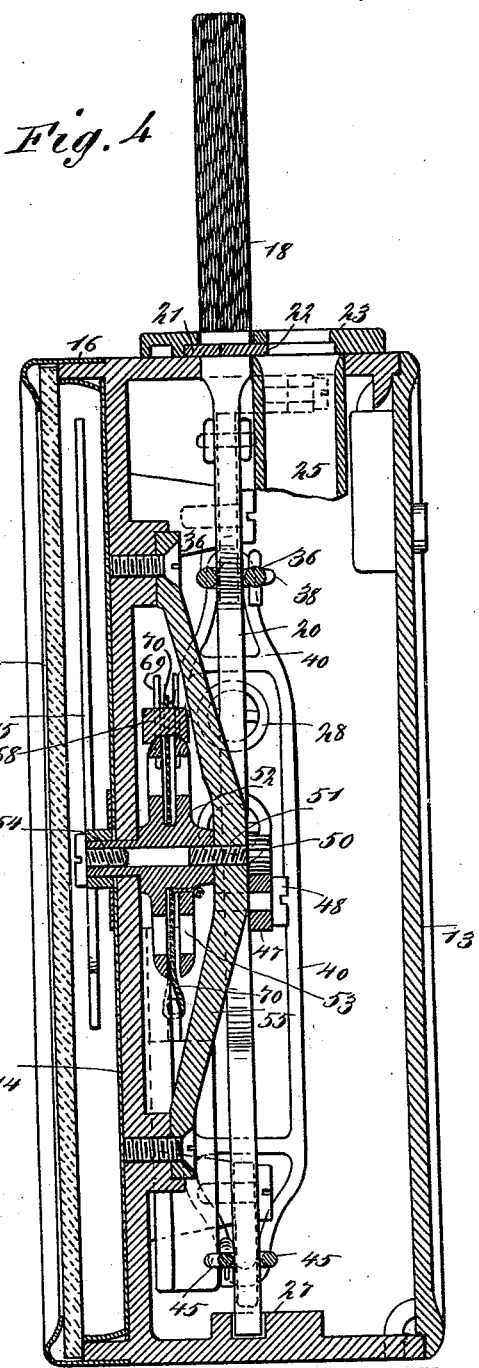
Figure 6:
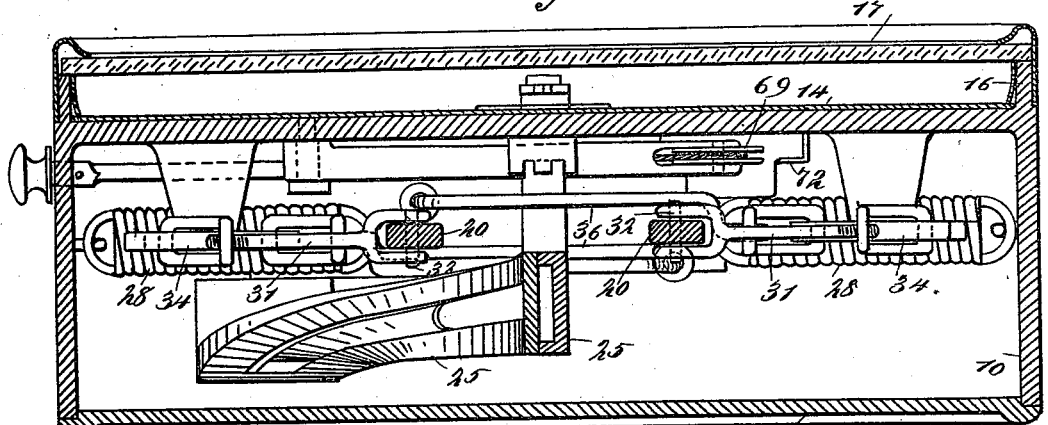
Figure 7:
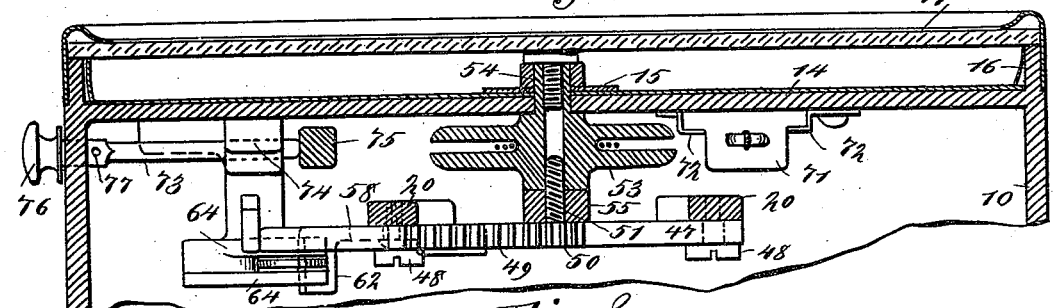
Figure 8:
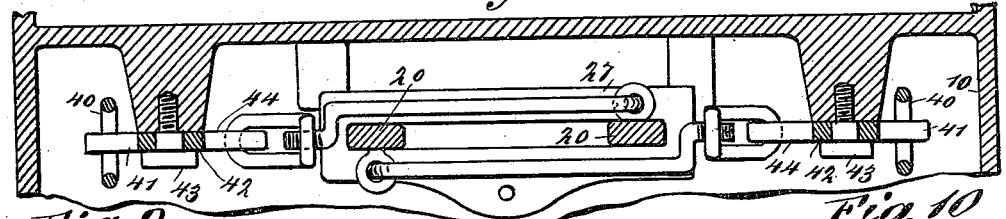
Figures 9, 10:
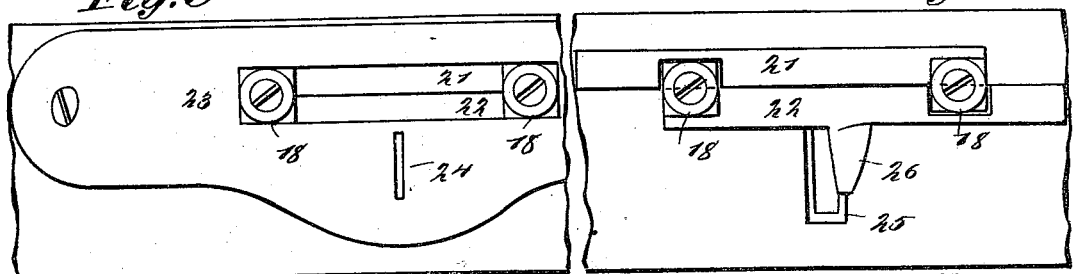

Figure 1 is a perspective view of the complete machine, embodying our invention. Fig. 2 is a rear elevation of the main case with the back door or cover removed, and with the levers and other parts in normal position, with the exception of the coin lever, which is shown actuated by a coin and in position to throw the handles into gear with the registering mechanism. Fig. 3 is a similar view with the coin chute removed, but with the handles and levers squeezed together and the other parts correspondingly displaced. Fig. 4 is a vertical section on the line 4—4 in Fig. 2. Fig. 5 is a vertical section on the line 5—5 in Fig. 2. Fig. 6 is a sectional plan on the line 6—6 in Fig. 2. Fig. 7 is a sectional plan on the line 7—7 in Fig. 2. Fig. 8 is a sectional plan on the line 8—8 in Fig. 2. Fig. 9 is a broken detail plan of the central portion of the machine, showing the coin slot, the plates for closing the slot for the handles, and the guard plate on the top of the machine; and Fig. 10 is a similar view, but with the guard plate removed.

The machine is provided with a suitable containing case 10, which may be of any approved shape and which is preferably mounted on a money box 11, having the usual lock-controlled door, and the money box is preferably supported upon a base or pedestal 12, but the money box and base form no part of the invention and the case 10 may be sustained in any suitable manner.

The case 10 is provided with a removable door or cover 13, at its back, which also may be of any approved kind which exposes the interior mechanism so that it may be easily adjusted or repaired if necessary. The case has on its front side a dial 14, like that shown in the former patent referred to, which is appropriately marked off and numbered to represent pounds; and a hand 15 moves around the dial, the point at which the hand stops indicating the amount of one's grip in pounds, as the pointer is actuated by the movement of the handle levers toward each other, and these levers are provided with resisting springs which are adjusted in such a way as to make the movement of the levers turn the pointer a distance corresponding to the resistance overcome by them, the mechanism whereby this is done being fully described hereinafter. The dial is incased in a projecting washer, rim, or flange 16 on the face of the case and is covered by a glass 17. The machine is provided with handles 18 which have preferably roughened exterior surfaces and which also preferably revolve on the spindles 19 of the levers 20, which levers are arranged parallel with each other and extend vertically through the case, the levers being normally held apart by springs, as described below, and adapted to be forced together against the tension of the springs by a person gripping the handles 18. It will be understood that the handles may be made smooth if preferred and that they are not necessarily revoluble. The levers 20 are adapted to move bodily toward and away from each other, and the slot in the top of the case, through which they extend, is closed by plates 21 and 22, see Figs. 9 and 10, which plates lie side by side, and these plates, when the levers are moved, overlap the slot in which the levers are held so as to cover the same and prevent the interior mechanism of the case from being tampered with. The plates 21 and 22 are covered by a guard plate 23, which is slotted to provide for the movement of the handles, and in this is a transverse coin slot 24 which registers with the coin chute 25, this delivering upon the lever which controls the registering mechanism, as hereinafter described.

The lever or cover plate 22 has a blade 26 on one side, which, when the levers are pressed, is carried across the top of the coin chute 25, so that if a person with a view of cheating the machine should have dropped a coin in the chute with a string attached to the coin, the blade will sever the string, and the coin, of course, cannot be removed. The lower ends of the levers move in a guideway 27, and the levers are held normally apart by springs 28 which are arranged preferably in pairs on opposite sides of the machine, each spring connecting with a hook 29 on the adjacent lever and a hook 30 on the wall of the case 10.

It will be seen then that to press the levers together it is necessary to stretch the springs. It is necessary to provide means for moving the levers bodily; that is, for moving them the same at the top as at the bottom so that there shall be no leverage to the advantage or disadvantage of the operator, and to this end the following simple mechanism is employed:—The levers are connected near the top with hooks 31 which are secured to studs 32, projecting through the levers, the hooks being arranged to straddle the levers, as shown in Fig. 6, and the outer ends of the hooks connect with the upper arms 33 of the angle levers 34, which are fulcrumed on studs 35 in the opposite upper corners of the case. The levers are also connected by hooks 36 with downwardly projecting hook-shaped arms 37 on the said angle levers, and the hooks 36 engage eyes 38 on the levers, but each hook engages the lever 20 on the opposite side of the machine to the angle lever 34 with which the said hook is connected, so that when a hook 31 moves in one direction, the hook 36 immediately beneath it will move in the opposite direction.

The angle levers 34 are provided, at their lower back sides, with arms 39 and these connect by the vertical yokes 40 with a hooked arm 41 on the tilting angle levers 42, which are fulcrumed on studs 43 in the opposite lower corners of the machine and which are adapted to move in unison with the upper angle levers 34. The angle levers 42 have inwardly projecting hooked arms 44 which are connected by means of hooks 45 with the lower ends of the levers, the hook on one angle lever connecting with the lever 20 on the opposite side of the machine and the hooks 45 preferably engage eyes 46 on the levers 20. It will be seen that when the levers are pressed together, the pressure of the hooks 31 and 36 on the upper angle levers will tilt the said levers into the position shown in Fig. 3, and as soon as this movement starts, the yokes 40, lifted by the arms 39 of the levers 34, tilt the lower angle levers 42 in the manner indicated in Fig. 3 and draw upon the hooks 45 so that the lower ends of the levers 20 are moved toward each other at the same rate as the upper ends of said levers.

The levers 20 are connected, near the center, by a horizontal rack bar 47 which is slotted longitudinally and which rests loosely on the studs 48 which are secured to the levers so that, under normal conditions when the levers are pressed together, the studs slide freely in the rack bar. This rack bar is thrown into a fixed or operative position by the dropping of a coin, as hereinafter described, and it has upon one edge, the upper edge preferably, a row of teeth 49 which engage a pinion 50 on the screw stud 51 which extends into the hub 52 of the controlling wheel 53, which wheel is journaled in the front wall of the case and in a supporting brace 55 and has a spindle 54 on its front side which projects through the face of the dial and carries the hand 15. It will be seen that the hand is operated by the turning of the pinion 50 or the wheel 53. The rack bar 47 has on its under side a shoulder 56 which is adapted to engage a lug 57 on the tilting coin lever 58, which is fulcrumed on one of the levers 20, so that when the lug is in engagement with the shoulder, the rack bar is moved longitudinally by the pressure of the levers 20 toward each other, and the pinion 50 and registering hand 15 are moved.

The lug 57 is held normally out of engagement with the shoulder 56 by means of the cable 59 and the weight 60, the cable being secured to one end of the lever and the weight to the cable, and the latter preferably slides through a guide eye 61. The coin lever 58 has, at one end, the end opposite the weight, a coin plate 62, which is adapted to swing into a notch 63 in the clamping plates 64, which embrace the lower end of the coin chute 25 just above the extension 66 of the chute, which extension delivers downward into the money box 11.

It will be understood that the clamping plates may be dispensed with and the notch made directly in the chute if desired, but in any event an abutting wall 65 is arranged opposite the notch 63, so that when a coin is dropped downward through the chute 25 it will strike the coin plate 62 and rest against the abutting wall 65, which is in the back of the chute, until the lever 20 carrying the lever 58 is moved and when this occurs the coin is released and drops downward through the extension 66 of the coin chute.

Journaled in the case on the front wall thereof, is a bell crank 67, one arm 68 of which extends horizontally above the controlling wheel 53 and rests firmly thereon, so as to act as a brake to the wheel and prevent the wheel from turning back together with the pinion 50 and hand 15 after the said parts have been actuated by the gripping of the handle levers. The arm 68 of the bell crank 67 has at its free end, a pulley 69, on which runs a cable 70 which is secured to the wheel 53, this being grooved deeply, as shown clearly in Figs. 4 and 7, so that the cable may run smoothly therein and not be liable to displacement. The wheel 69 is also deeply grooved to receive the cable, and the lower end of the cable is secured to a weight 71 which slides vertically in the slideway 72 in the case, and the weight is heavy enough to cause the arm 68 to bear with the necessary friction on the wheel 53 and, when the arm 68 is raised, as described below, the weight 71 is heavy enough to unwind the cable 70 and turn the wheel 53, so as to throw the hand 15 back to its normal position and also return the rack bar 47 to its normal position.

The arm 68 is raised, so as to throw the machine into operative position, by the following mechanism:—The bell crank 67 has a depending arm 75 which is arranged in the path of a push rod 73 which slides through the outer wall of the case and through a guide 74 within the case, and the push rod has at its outer end a button 76 and is also provided, within the case, with a pin 77 which prevents it from being pulled too far out.

The machine is operated as follows:—The operator drops his coin into the slot 24 and the coin runs down the chute 25, falls upon the plate 62, tilts the lever 58, and this throws the lug 57 into engagement with the shoulder 56 on the rack bar 57. The push button 76 is then pushed in, although this may be done before dropping the coin if desired, and the operator then grips the handles 18 with one or both hands and squeezes them to test the strength of his grip. As the operator squeezes upon the handles, the handles and the levers 20 are moved toward each other against the tension of the springs 28, the levers moving bodily; that is, an equal distance at the top and bottom, by reason of the angle lever connection between them above described, and as the lever 58 connects the rack bar 47 with one of the levers 20, it will be seen that the movement of the levers toward each other will cause the rack bar 47 to slide, and this turns the pinion 50, wheel 53, and hand 15, the latter moving a distance over the face of the dial corresponding in pounds to the resistance overcome by the moving of the levers. It will be observed that as soon as the lever 20, which carries the coin lever 58 starts, it removes the lever from the coin chute so as to permit the coin to drop and also to permit the weight 60 to pull the lug 57 out of engagement with the shoulder 56; this latter movement, however, does not occur until the pressure is removed from the levers 20, as while the levers are being pressed the friction of the parts holds the lug in place. When the operator has squeezed until he cannot squeeze any more, he releases the handles 18 and the levers 20 spring back to their former position, the rack bar 47 sliding loosely on the studs 48 and, by reference to the dial, the position of the hand will show the strength of his grip. The machine is then reset ready for another operation, by pressing in the button 76 which pushes the rod 73 against the arm 75 of the bell crank 67, and this lifts the arm 68 from the wheel 53 so that the weight 71, which has been previously wound up by the turning of the wheel 53, drops and unwinds the cable 70, thus turning the wheel back to its normal position and carrying with it the hand 15 and the rack bar 47, and the shoulder 56 on the rack bar is again brought into position to be engaged by the lug 57 of the coin lever.

It will be seen from the above description that the movements of the levers are not dependent upon any gearing or locking mechanism, but that when moved without dropping a coin in the slot of the machine, the studs 48 simply slide in the rack bar 47 and the registering mechanism is not operated.

Having thus described our invention, we claim as new and desire to secure by Letters Patent—

1. In a grip testing machine, the combination, with the handle levers arranged to move bodily and in parallel relation in the machine, of the resisting springs secured directly to the levers and to the adjacent walls of the machine, substantially as described.

2. The combination, with the main handle levers adapted to move toward and away from each other, the containing case, the resisting springs secured directly to the levers and to the adjacent walls of the case, the three-armed angle levers in the upper corners of the case, the upper arms of the angle levers being connected to the nearest handle levers and two of the lower arms of the angle levers being connected with the handle levers on the opposite side of the machine, two armed angle levers in the lower corners of the case, yokes connecting the outer arms of the lower angle levers to the third arms of the upper angle levers, and connections between the second arms of the lower angle levers and the handle levers, whereby the handle levers are moved equally at top and bottom, substantially as described.

3. The combination, with the handle levers and the slotted case in which the levers move, of the coin chute leading downward from the top of the case, plates carried by the levers and adapted to close the slot through which they extend, and a blade carried by one of the plates and movable over the top of the coin chute, substantially as described.

4. The combination, of the removable handle levers, the registering mechanism connected therewith, a rack bar loosely mounted on the levers and geared to the registering mechanism, and a coin-operated lever to fasten the rack bar to one of the handle levers, substantially as described.

5. In a grip testing machine, the combination, with the handle levers and the registering mechanism actuated thereby, of a rack bar loosely mounted on the levers and geared to the registering mechanism, a coin-operated lever carried by one of the handle levers and adapted to make a rigid connection with the rack bar, and a weight to normally throw the coin lever out of engagement with the rack bar, substantially as described.

6. The combination, with the handle levers and the coin chute having a notch in one side and an abutting wall opposite the notch of the registering mechanism, the rack bar loosely mounted on the levers and geared to the registering mechanism, the tilting coin lever carried by one of the handle levers and extending into the notch of the coin chute, and means for fastening the coin lever to the rack bar when it is tilted by a coin, substantially as described.

7. The combination, of the notched coin chute, the handle levers arranged to move toward and away from each other, the rack bar loosely connecting the levers, the registering mechanism geared to the rack bar, the shoulder on the rack bar and the tilting coin lever carried by one of the handle levers and projecting into the notch in the chute, the coin lever having at the end opposite the notch a lug to engage the shoulder on the rack bar, and a weight to throw the lug out of engagement with said shoulder, substantially as described.

8. The combination, with the handle levers, the rack bar connecting the levers, and the registering mechanism geared to the rack bar and arranged to move a hand over a dial, of a friction arm acting as a brake on the registering mechanism, a weight adapted to press the arm into position and also to return the registering hand to normal position, and means for raising the friction arm to permit the dropping of the weight, substantially as described.

9. The combination, with the handle levers, the rack bar loosely connecting the levers, and the coin-controlled lever adapted to fasten the rack bar to one of the handle levers, of the controlling wheel and dial hand geared to the rack bar, a friction arm arranged to bear on the controlling wheel, a weighted cable secured to the controlling wheel and running over a pulley in the friction arm, and a push button for raising the friction arm upon the controlling wheel, substantially as described.

10. The combination, with the handle levers, the rack bar loosely connecting them, and the coin-controlled lever for fastening the rack bar to one of the handle levers, of the controlling lever, and the registering hand geared to the rack bar, substantially as described.

11. The combination, with the handle levers, the rack bar loosely connecting the levers, and the coin-controlled lever to throw the rack bar into rigid connection with one of the handle levers, of the controlling wheel and registering hand geared to the rack bar, the tilting bell-crank having a friction arm to ride on the controlling wheel, a pulley at the free end of the friction arm, a weighted cable secured to the controlling wheel and running over the pulley on the friction arm, and a push button to tilt the bell crank and raise the friction arm, substantially as described.

THEOBALD E. J. SCHAIBLY.
WALTER SCHAIBLY.

Witnesses:
CHARLES OTTO,
ALBERT H. KADUC.